(12) United States Patent
DePaul

(10) Patent No.: US 8,779,290 B1
(45) Date of Patent: Jul. 15, 2014

(54) CORNER WALL CONDUIT

(71) Applicant: Robert DePaul, Red Bank, NJ (US)

(72) Inventor: Robert DePaul, Red Bank, NJ (US)

(73) Assignee: Crownduit Systems, LLC, Red Bank, NJ (US)

(*) Notice: Subject to any disclaimer, the term of this patent is extended or adjusted under 35 U.S.C. 154(b) by 0 days.

(21) Appl. No.: 14/066,813

(22) Filed: Oct. 30, 2013

(51) Int. Cl.
*H02G 3/04* (2006.01)
*H02G 3/30* (2006.01)

(52) U.S. Cl.
CPC .................................... *H02G 3/30* (2013.01)
USPC ...................................................... 174/68.3

(58) Field of Classification Search
USPC ...... 174/68.1–68.3, 48, 99 R, 21 R, 24, 72 A, 174/72 C, 135, 95; 52/220.5, 220.7; 138/109.162; 248/48.2
See application file for complete search history.

(56) References Cited

U.S. PATENT DOCUMENTS

| | | | | |
|---|---|---|---|---|
| 3,302,350 | A * | 2/1967 | Brown et al. | 52/288.1 |
| 5,711,123 | A * | 1/1998 | Lamont et al. | 52/287.1 |
| 5,929,380 | A * | 7/1999 | Carlson et al. | 174/68.3 |
| 6,287,046 | B1 * | 9/2001 | Neuhofer, Jr. | 403/382 |
| 7,223,925 | B2 * | 5/2007 | Ewer et al. | 174/481 |
| 7,385,148 | B2 * | 6/2008 | Picard et al. | 174/481 |
| 7,574,836 | B2 * | 8/2009 | Wesolowska | 52/288.1 |
| 8,534,016 | B2 * | 9/2013 | Depaul | 52/288.1 |

* cited by examiner

*Primary Examiner* — Boris Chervinsky
*Assistant Examiner* — Pete Lee
(74) *Attorney, Agent, or Firm* — Arthur M. Peslak; Gertner Mandel & Peslak

(57) ABSTRACT

An integrated conduit and molding mounting system for use at the intersection of a wall and ceiling is disclosed. The system comprises a conduit receiver and a conduit cover bonded to a molding piece. After installation of the conduit receiver at the wall and ceiling joint, the conduit cover and molding is snapped into place over the conduit receiver. The system also comprises a corner piece to eliminate mitering the joints at a corner and a seam cover to be mounted at the intersection of two straight runs.

4 Claims, 11 Drawing Sheets

CORNER WALL CONDUIT

BACKGROUND OF THE INVENTION

The present invention is directed to the field of building construction. In particular it is directed to the field of moldings or trim work used at the top of walls and ceilings. The present invention is also directed to the field of installing cables in buildings for various purposes such as telephone cables, electrical wiring cables, fiber optic cables, cable or satellite television cables and other similar cables and wire.

In general, the utility company provides a main line for service into the building. In an apartment or office complex, the service lines to the individual units must be run separately into the individual units. Consequently, the lines are run through various parts of the buildings. Generally, the cables run through the interior hallways in conduits located in the corner where the side walls meet the ceilings. The conduit covers must be easily removable to service, upgrade and to splice the cables when each customer calls for service.

The presently available conduits for use in these types of buildings generally are mounted at the corner where the walls intersect the ceiling. The available conduits generally are fabricated from plastic with a triangular cross-section. Thus, the currently available conduits provide a plain and inexpensive looking appearance. This inexpensive looking appearance creates a problem in up-scale residences and office buildings because it detracts from the ambiance of the building. In such up-scale buildings, the occupants expect high quality appearing moldings at the corners of walls and ceilings. However, placing a conventional corner molding over the available conduits cannot be easily implemented.

A primary object of the present invention is to solve the aforementioned problem. The present invention, as explained in detail below, solves this problem by providing a novel corner conduit and molding combination for installing wires and cables therein. The interchangeable architectural face plate also allows for ease of installation for the typical homeowner. Pre-finished moldings can be installed without nails or putty eliminating the need to nail through the pre-finished face plate. The system eliminates mitering, coping and provides an overlapping seam cover to allow for expansion and contraction. The product is also UL® rated and may be used as a path for electrical wiring.

There are many techniques currently used for installing and mounting various types of decorative molding at the intersection of walls and ceilings. Most of the techniques are complicated and difficult to accomplish especially at corners and intersections of molding pieces. In addition to these issues, it has been contemplated that moldings can be also utilized to contain a conduit for the installation of various types of cables and wires. In this way, unsightly cables and wires can be easily installed or replaced but also are hidden from view.

Another issue with available extrusion and injection molding manufacturing processes, (due to different screw temperature settings for both processes) is that it will always yield a different color and gloss between the extruded lineal and the injection molded fittings. An object of the present invention is create a molding system whereby the color and gloss of the various components can be matched.

The primary object of the present invention is to solve the problems with the presently available moldings by providing a simple to install system to which a variety of molding designs can be attached. In addition, the present invention incorporates a conduit for the installation of various types of cables.

SUMMARY OF THE INVENTION

A crown molding conduit system for installation at the intersection of a wall and ceiling comprising a conduit receiver comprising two side surfaces generally oriented perpendicular to each other, a back surface and semi-circular receiving ends disposed near the ends of the side surfaces whereby the side surfaces and back surface form an enclosure for receipt of cables or conduits; a conduit cover comprising a central panel with longitudinal serrated grooves on one side thereof, connecting units adapted to removeably snap into the semi-circular receiving ends, a longitudinal projection with serrated groves on its vertical surfaces and first projections on the end thereof and second projections on the end of the conduit cover; and a molding fixed to the conduit cover by adhesive placed in the serrated grooves and by the first projections and second projections digging into the surface of the molding wherein the conduit cover and molding are removeably attached to the conduit cover by snapping the connecting units into the semi-circular receiving ends.

DETAILED DESCRIPTION OF THE INVENTION

Figure 1:
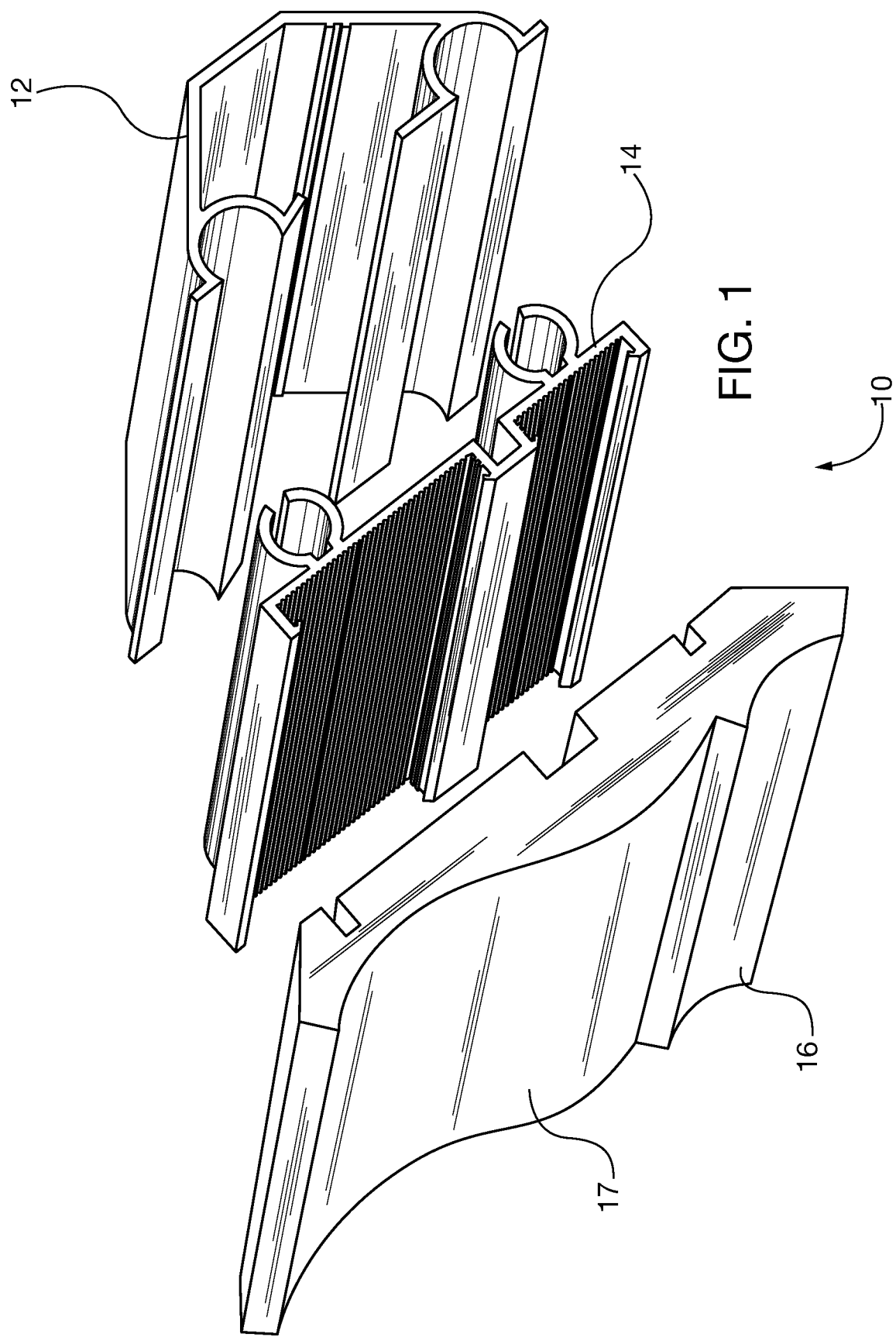
FIG. 1 is an exploded perspective view of the present invention

The present invention will now be described in terms of the presently preferred embodiment thereof as illustrated in the drawings. Those of ordinary skill in the art will recognize that many obvious modifications may be made thereto without departing from the spirit or scope of the present invention.

The corner conduit 10 is shown in the drawings. The corner conduit 10 comprises a generally hollow longitudinally extending cable receiver 12, a longitudinally extending conduit cover 14 and a molding 16. The molding 16 comprises a front ornamental surface design 17. The ornamental surface design 17 shown in the appended drawings is merely one example of the ornamental surface features of the molding 16 that could be used as an interchangeable face plate on the cable receiver 12. It is presently contemplated that the molding 16 may be fabricated from MDF, wood, PVC, foam PVC, polyurethane, vinyl, styrofoam (also called expanded polystyrene) or nylon although other materials may be used without departing from the spirit or scope of the present invention.

The corner conduit 10 will be UL® rated and may be used as a path for electrical wiring.

Figure 2:
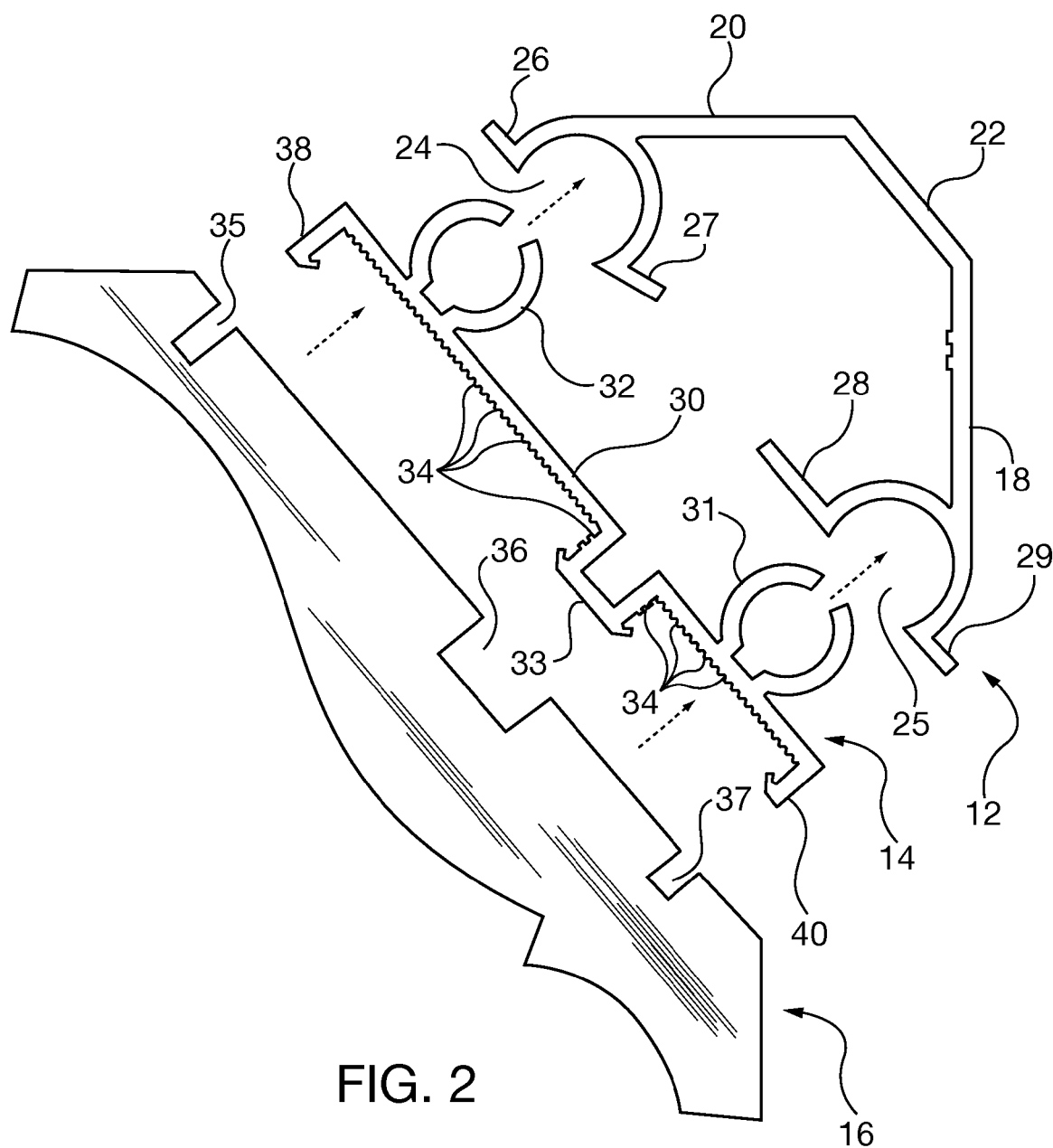
FIG. 2 is an exploded side view of the present invention.
Figure 3:
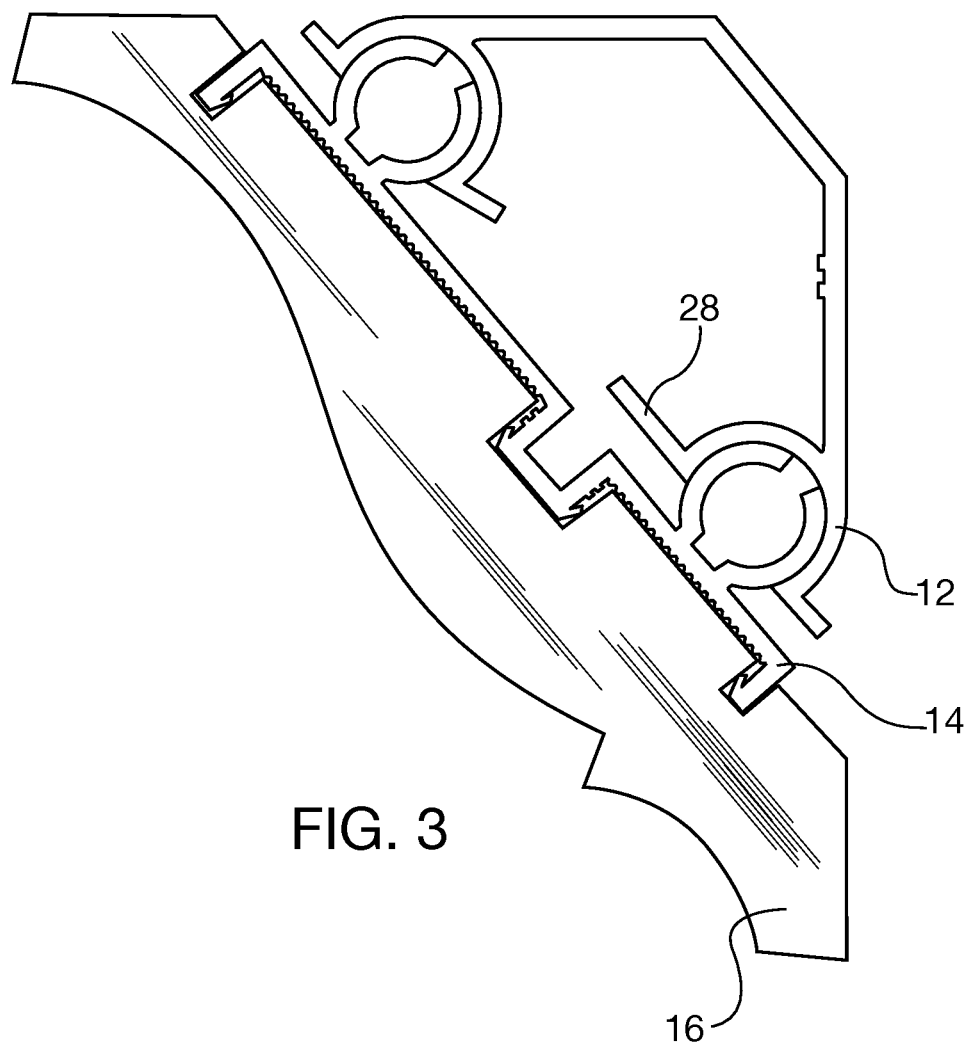
FIG. 3 is an assembled side view of the present invention.
Figure 4:
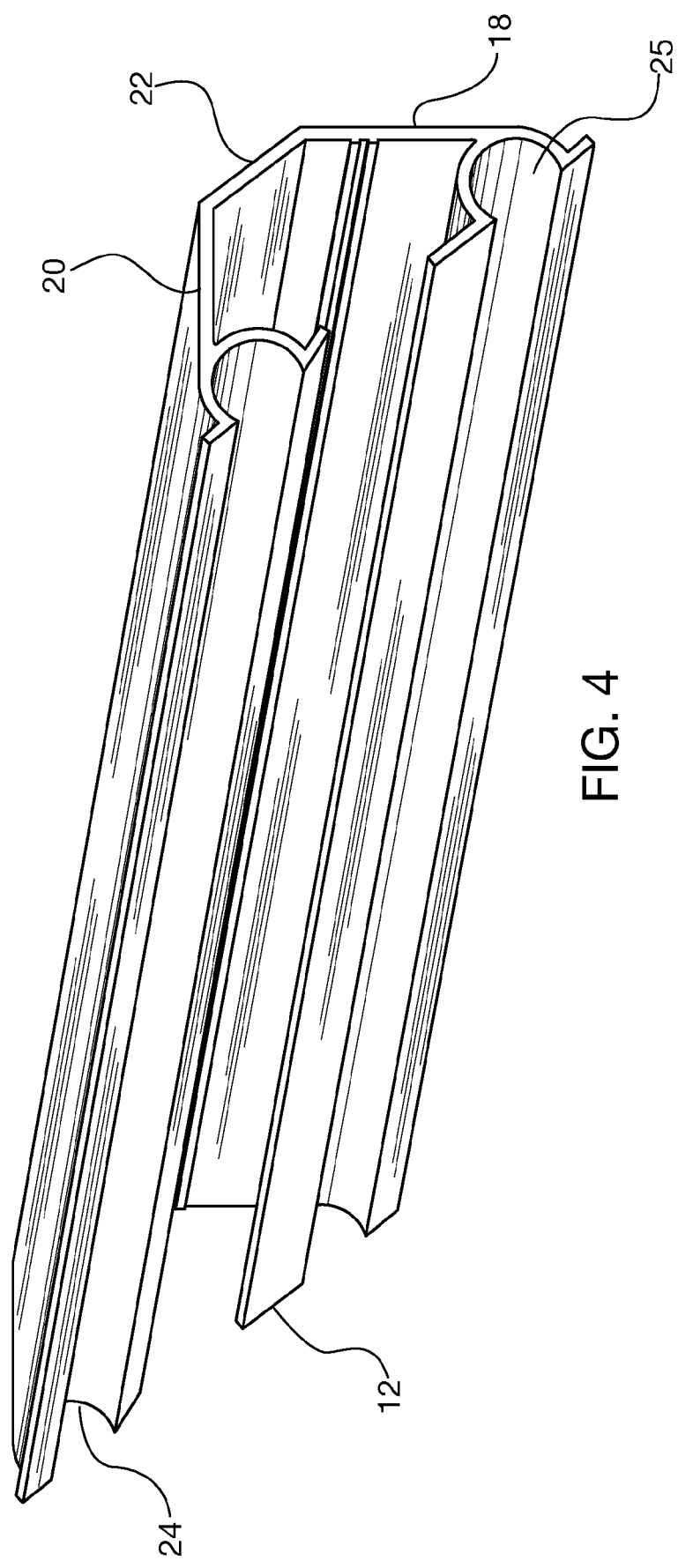
FIG. 4 is a perspective view of a part of the present invention.

The cable receiver 12 is illustrated in cross-section in FIGS. 2 and 3. The cable receiver 12 comprises two side panels 18 and 20, generally oriented perpendicular to each other, with an integral back panel 22. The cable receiver 12 forms a trough where cables can be placed. The cable receiver 12 is adapted to be installed in a corner where a side wall meets a ceiling with the side panel 20 adjacent to the ceiling and the side panel 18 adjacent to the side wall. The cable receiver 12 is generally attached to the wall and ceiling by means of conventional fastening techniques, such as screws, well known to those of ordinary skill in the art. The cable receiver 12 further comprises semi-circular open receiving ends 24 and 25. First receiving end 25 comprises projections 28 and 29. Second receiving end 24 comprises projections 26 and 27.

The conduit cover 14 will now be described in detail. The conduit cover 14 is adapted to securely snap into the cable receiver 12 as shown in the assembled view of FIG. 3. The conduit cover 14 comprises a central panel 30, a first open circular connecting unit 31 and a second open circular connecting unit 32.

The central panel 30 is flat with a generally rectangular longitudinal projection 33. The central panel 30 comprises a plurality of longitudinal serrated grooves 34. The rectangular projection 33 also comprises longitudinal grooves 34 on its vertical outside surface 3. The first connecting unit 31 extends from the central panel 30 on the opposite to the second connecting unit 32. The first connecting unit 31 is adapted to be received in first receiving end 25 on the side panel 20 and the second connecting unit 32 is adapted to be received in the second receiving end 24. The central panel 30 further comprises two end projections 38 & 40.

The generally rectangular projection 33 on central panel 30 is adapted to be received into a mating opening 36 on molding 16. The conduit cover 14 further comprises two end projections 38 and 40 that are adapted to be received in mating openings 35 and 37 on molding 16.

Figure 5:
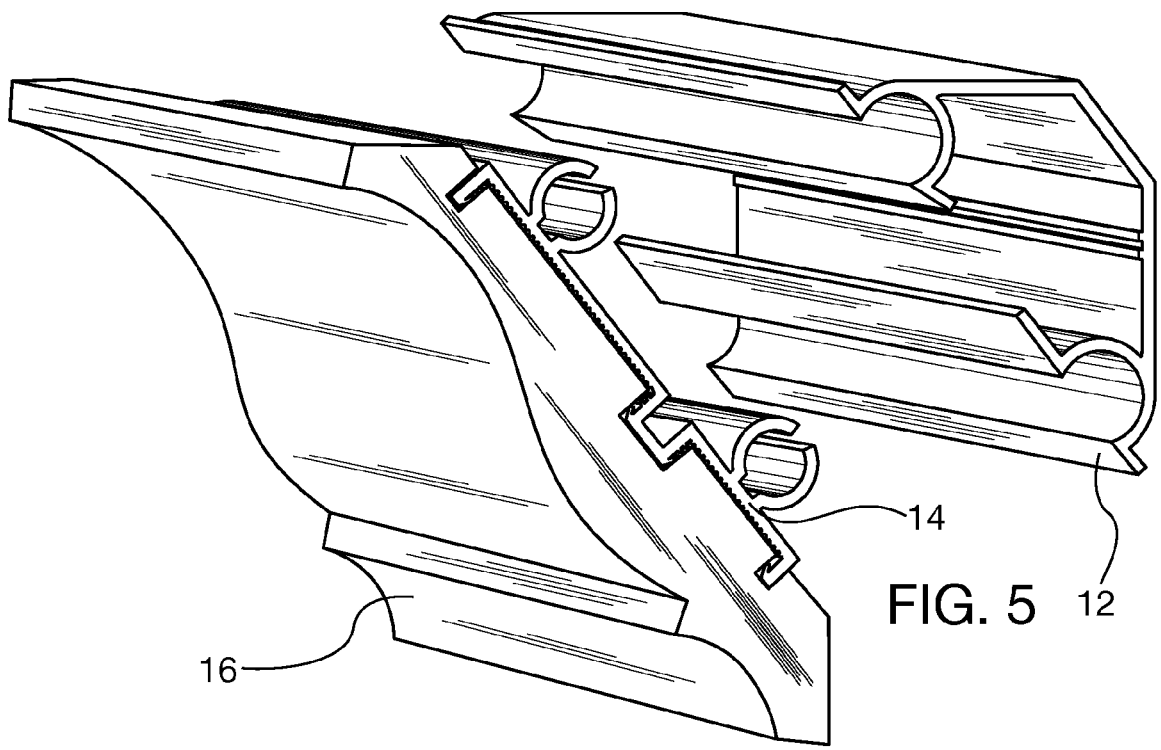
FIG. 5 is a partially exploded perspective view of the present invention.

As shown in FIG. 3, the molding 16 is joined to the conduit cover 14. Prior to joining the molding 16 to the conduit cover 14, a layer of adhesive is placed over the longitudinal grooves 34 on the central panel 30 and the vertical surface of the generally rectangular projections 33. The presently preferred type of adhesive is thermoplastic amorphous polypropylene although other types of similar adhesives may be used without departing from the scope of the patent invention. The longitudinal grooves 34 create more surface area for the adhesive layer to bond securely and prevent delamination of the adhesive bond due to shearing. After the adhesive layer is placed on the conduit cover 14, the conduit cover 14 is secured to the molding 16 as shown in FIG. 5. The small tips on the end of projections 38, 40 and 33 dig into the molding 16 and help create a secure attachment between the conduit cover 14 and the molding 16.

Figure 6:
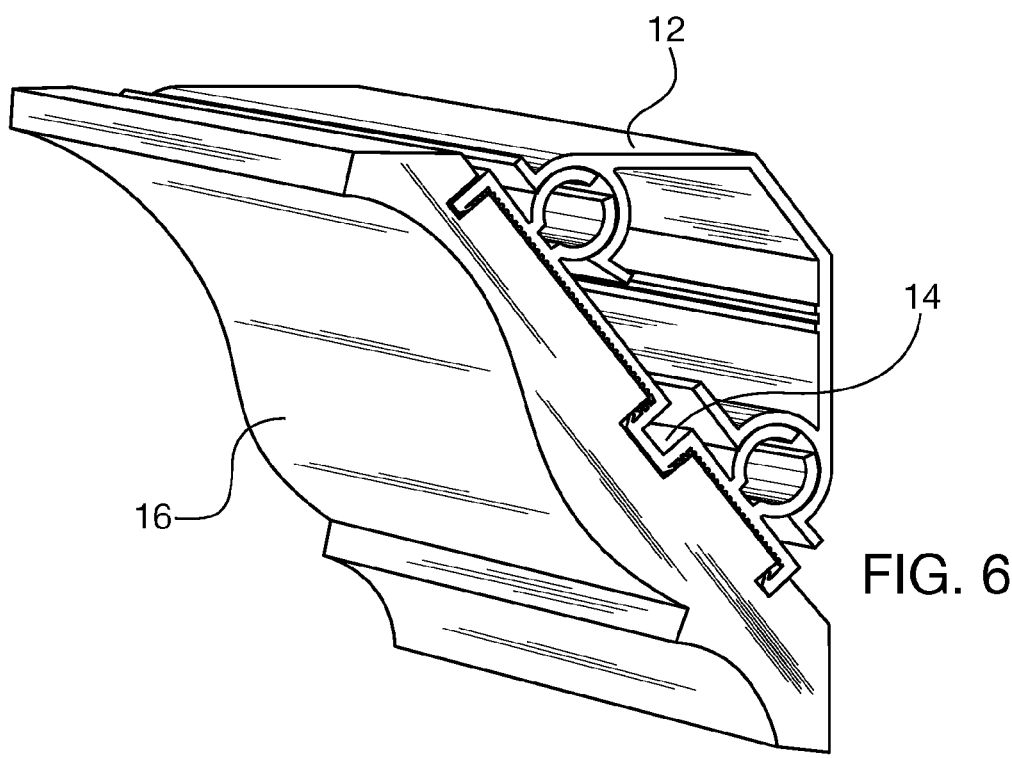
FIG. 6 is an assembled perspective view of the present invention.
Figure 7:
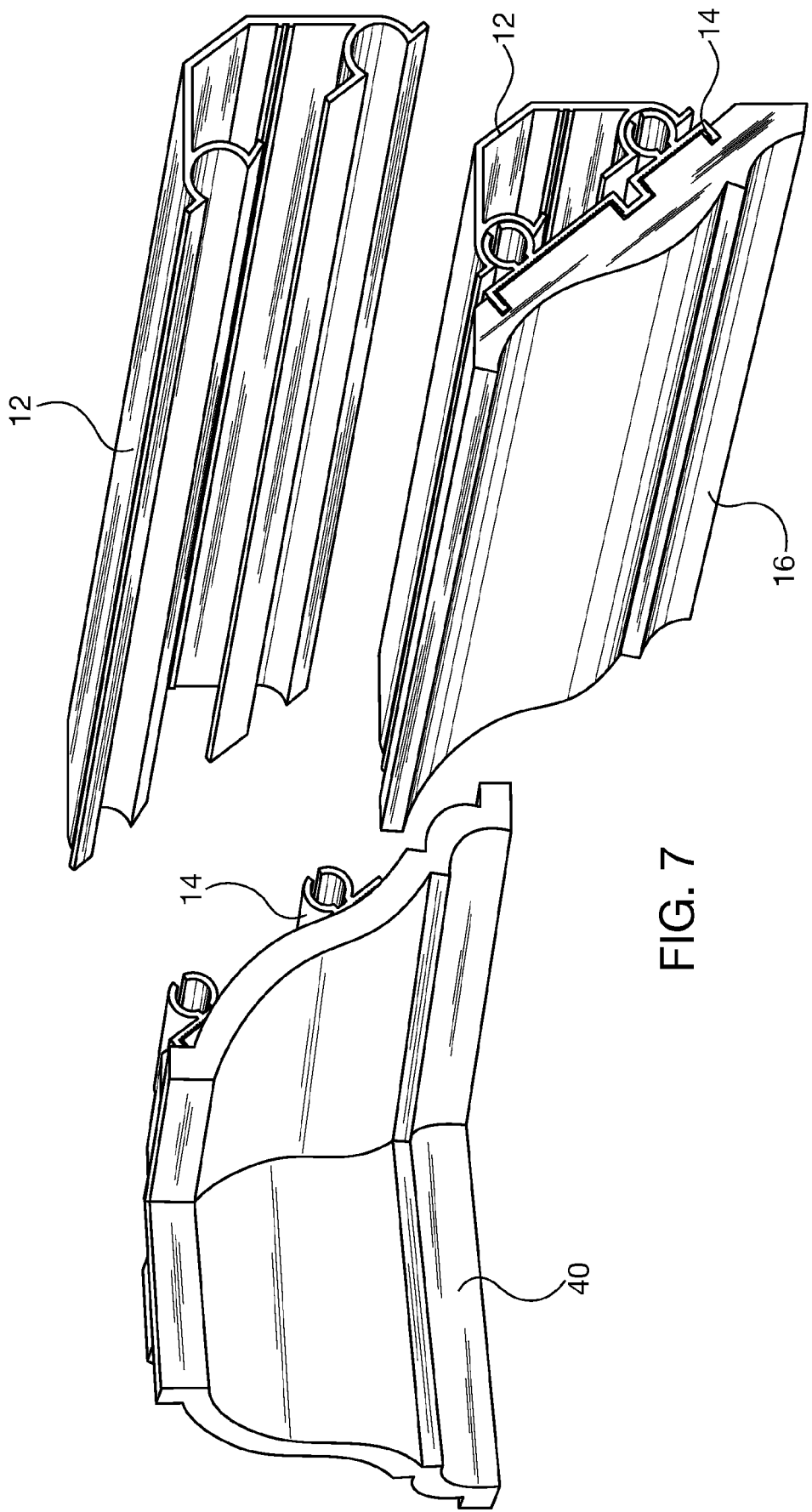
FIG. 7 is a partially exploded view of the present invention.

The cable conduit 12 receives the unitary conduit cover 14 and molding 16 after bonding as illustrated in FIG. 6. The first and second connecting open units 31 and 32 are received in the openings 24 and 25 on the cable conduit 12. The diameter of the openings 24 and 25 are such that the first and second open connecting units 31 and 32 are slightly displaced inward at the openings on the ends thereof. After passing through the openings 24 and 25, the connecting units 31 and 32 then expand outward and securely attach to the conduit receiver 12. When assembled as shown in FIG. 3, the projection 28 forms a trough which receives the cables or wires to keep them from spilling out if the cover is removed.

The final assembly of the conduit receiver 12, conduit cover 14 and molding 16 is placed at the intersection of a wall and ceiling. The conduit receiver 12 is first affixed to the wall and ceiling with conventional fasteners such as screws and the cables are placed therein. The bonded molding 16 and conduit cover 14 is then snapped in place as described above and can also be removed in similar fashion.

Figure 8:
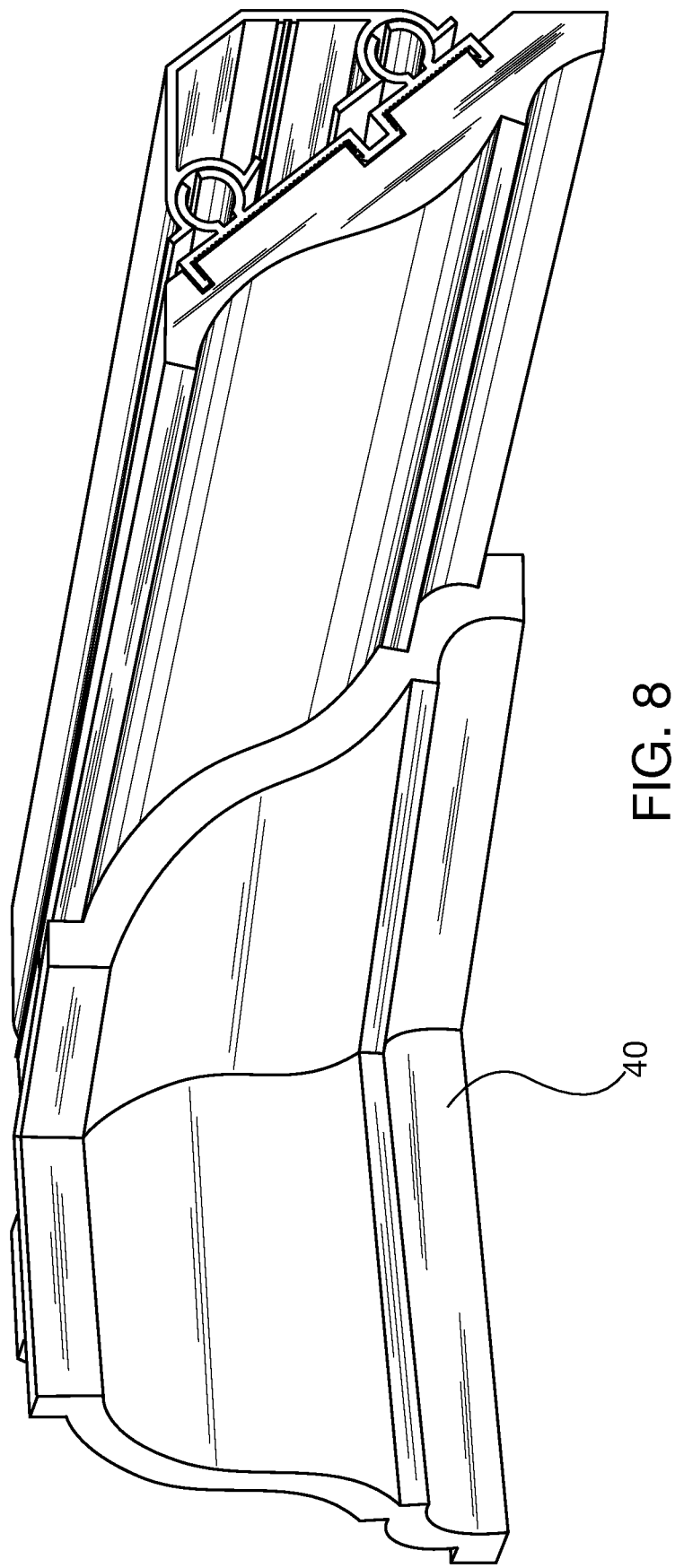
FIG. 8 is an assembled perspective view of the present invention.
Figure 9:
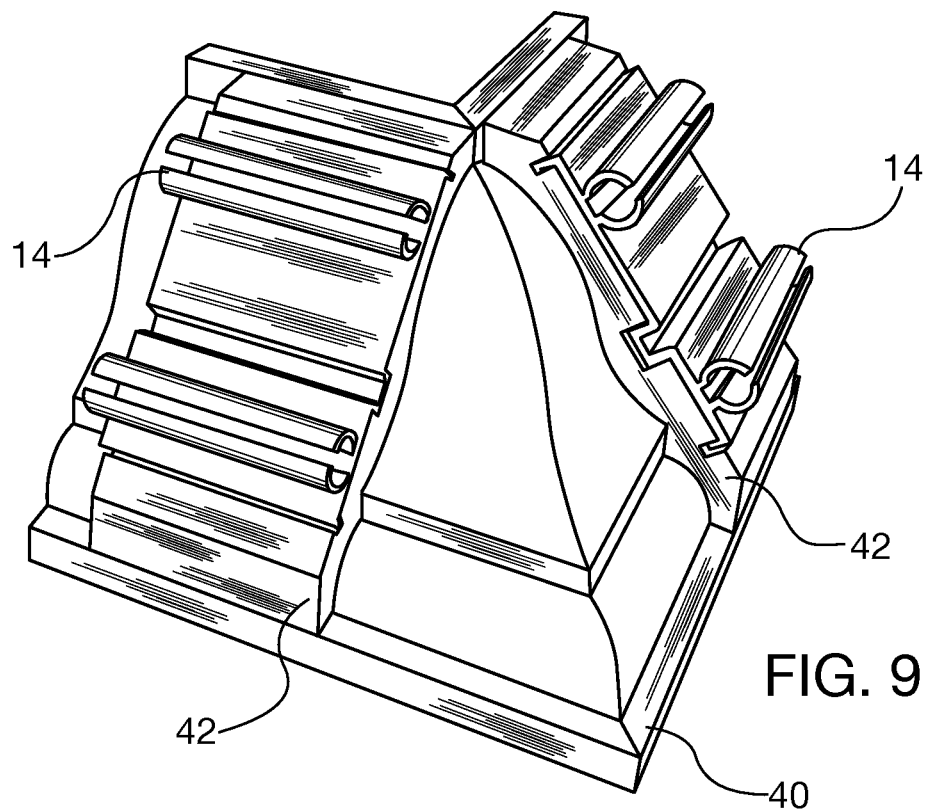
FIG. 9 is a side view of the present invention as installed.
Figure 10:
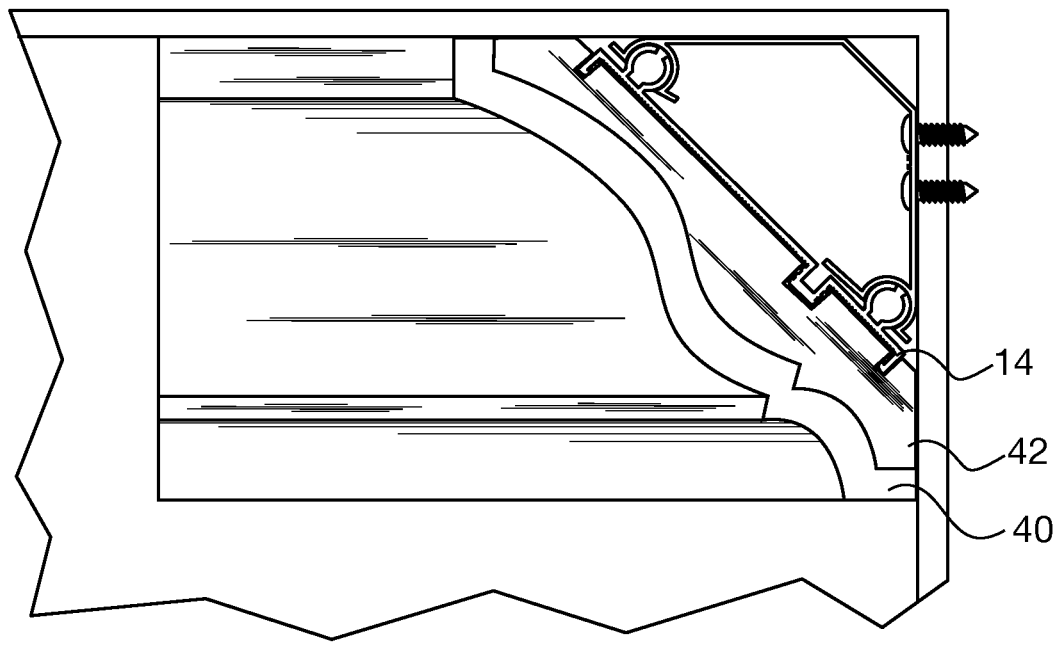
FIG. 10 is an assembled perspective view of the present invention as installed.

The present invention is adapted to be installed in a corner with the use of a corner molding 40. The corner molding 40 is generally formed in a right angle. On the rear of each side of the corner molding is a portion of the conduit cover 14 as shown and described above. In the case of the corner molding 40, the conduit cover 14 is mounted to a block 42 which is adapted to be bonded with adhesive onto the contour of the back side of the molding piece 40. This creates a smooth fit with the strait pieces of molding near to the corner and the electrical cables can easily be run past the corner. The corner molding piece 40 makes a smooth transition between two straight runs of conduit as shown in FIG. 8 The corner molding 40 thus eliminates any miter cuts that would ordinarily be required at a corner for conventional molding.

Figure 11:
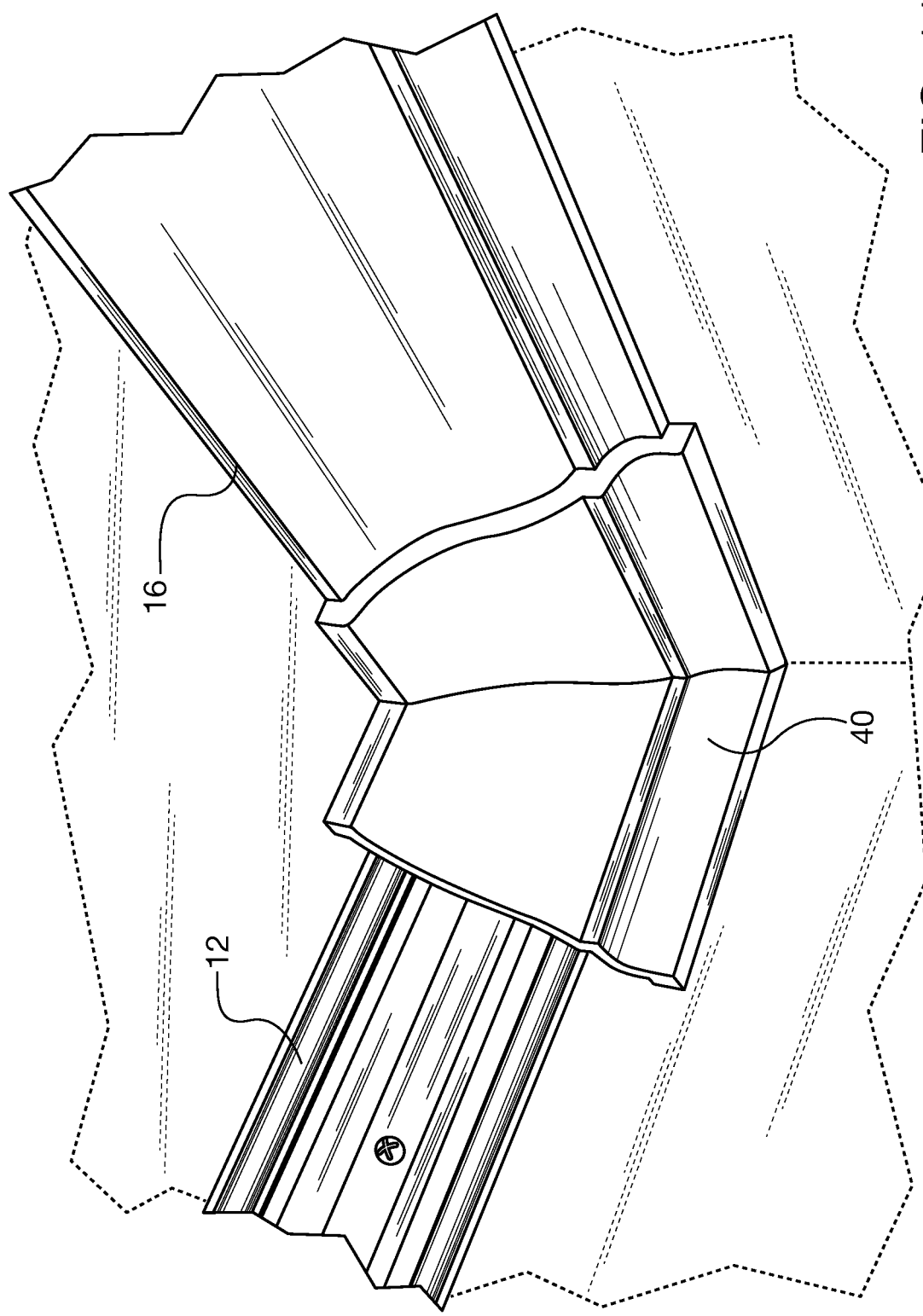
FIG. 11 is a view of a partial assembly view of the present invention at the intersection of two walls.
Figure 12:
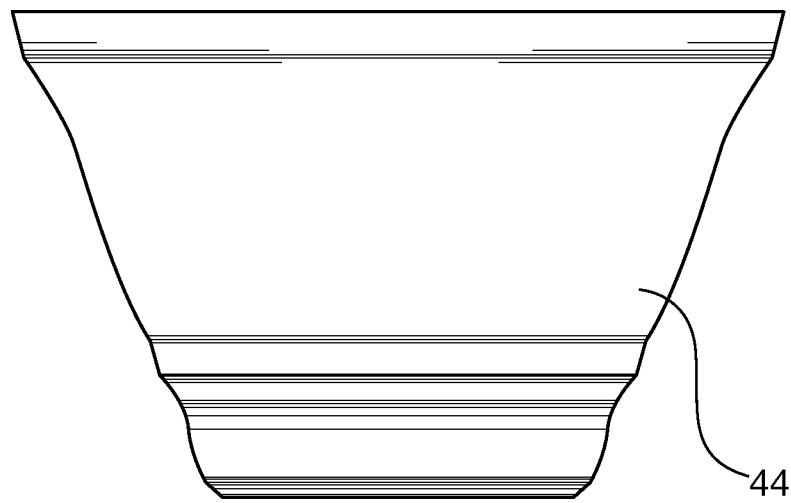
FIG. 12 is a front view of a portion of the present invention.
Figure 13:
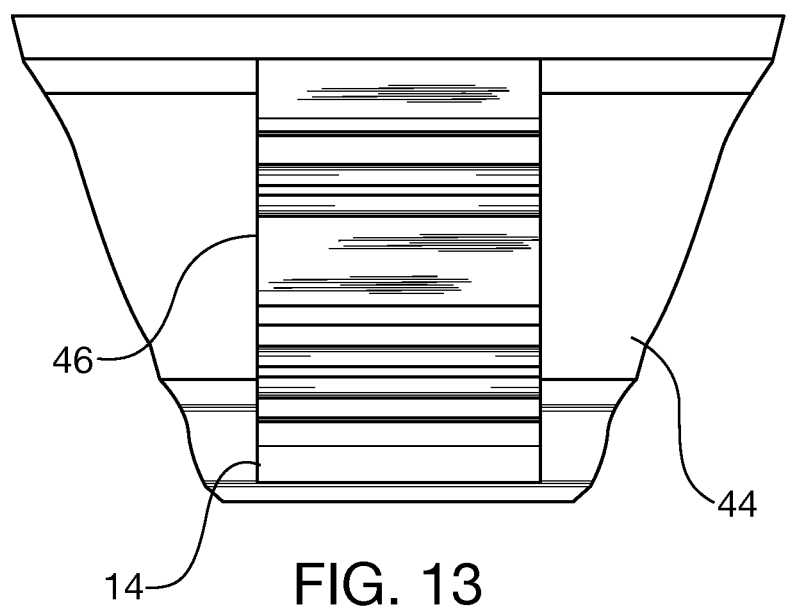
FIG. 13 is a rear view of a portion of the present invention.
Figure 14:
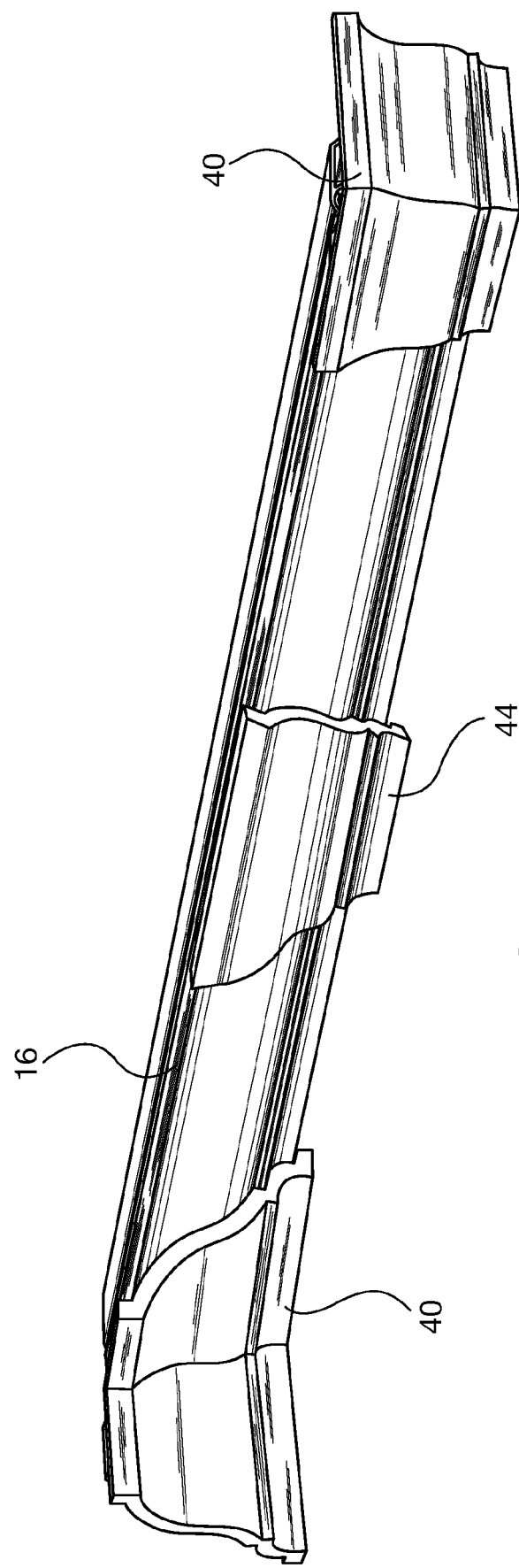
FIG. 14 is a perspective view of an embodiment of the present invention.

FIG. 11 illustrates a molding seam covering piece 44. The seam covering piece 44 is used where more than one piece of conduit is required on a long straight wall. The seam molding piece 44 is constructed in similar fashion to the corner molding piece 40 in that a portion of the conduit cover 14 is bonded to a block 46 that is adapted to fit into the contour of the back side of the seam molding piece 44. The seam molding piece 44 snaps into the conduit receiver 12 so that a seam in the molding is not visible.

Those of ordinary skill in the art will recognize that many obvious modifications may be made thereto without departing from the spirit or scope of the present invention as set forth in the appended claims.

What is claimed is:

1. A crown molding conduit system for installation at the intersection of a wall and ceiling comprising:
    a conduit receiver comprising two side surfaces generally oriented perpendicular to each other, a back surface and semi-circular receiving ends disposed near the ends of the side surfaces to form a trough whereby the side surfaces and back surface and the trough form an enclosure for receipt of cables or conduits; a conduit cover comprising a central panel with longitudinal serrated grooves on one side thereof, connecting units adapted to removably snap into the semi-circular" receiving ends, a longitudinal projection with serrated groves on its vertical surface and first projections on the end thereof and second projections on the end of the conduit cover;
    a molding fixed to the conduit cover by adhesive placed in the serrated grooves and by the first projections and second projections digging into the surface of the molding and a corner molding piece which comprises a molding portion, a block affixed to the rear of the molding portion and a portion of a conduit cover Wherein the conduit cover and molding are removably attached to the conduit cover by snapping the connecting units into the semi-circular receiving ends and whereby the corner molding piece can be removably placed over the intersection of two conduit receivers at the corner where two walls intersect.

2. The system of claim 1 further comprising a seam cover piece which comprises a molding portion, a block affixed to the rear of the molding portion and a portion of a conduit cover bonded to the block whereby the seam cover piece can be removably placed over the intersection of two conduit receivers at the intersection thereof on a straight wall.

3. A method for installing conduit in a molding system comprising the steps of:
  a) providing a conduit receiver comprising two side surfaces generally oriented perpendicular to each other, a back surface and semi-circular receiving ends disposed near the ends of the side surfaces to form a trough whereby the sides and surfaces and back surface and trough form an enclosure for receipt of cables or conduits;
  b) providing a conduit cover comprising a central panel with longitudinal serrated grooves on one side thereof, connecting units adapted to removably snap into the semi-circular receiving ends, a longitudinal projection with serrated groves on its vertical surfaces and first projections on the end thereof and second projections on the end of the conduit cover,
  c) Fixing a molding to the conduit cover;
  d) Attaching the conduit receiver to the intersection of a wall and ceiling;
  e) Placing cables in the enclosures;
  f) providing a corner molding piece, which comprises a molding portion, a block fixed to the rear of the molding portion and a portion of a conduit cover bonded to the block; and
  g) Attaching the molding and conduit to the conduit receiver by snapping the connecting units into the semi-circular ends and removably placing the corner molding piece at the intersection between two conduit receivers at an intersection between two walls.

4. The method of claim 3 further comprising the steps of providing a seam cover piece, which comprises a molding portion, a block affixed to the rear of the molding portion and a portion of a conduit cover bonded to the block and removably placing the seam cover piece at the intersection between two conduit receivers.

* * * * *